Nov. 1, 1960    A. R. SEGAL    2,958,240
METHOD OF GRINDING RELIEFS ON CUTTERS
Filed Aug. 16, 1957    2 Sheets-Sheet 1
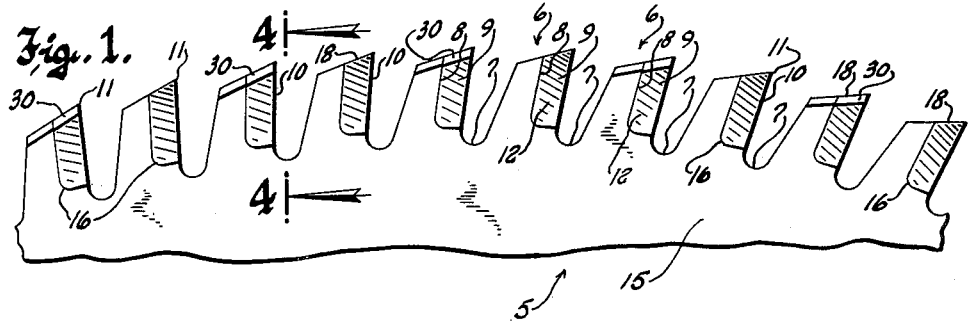
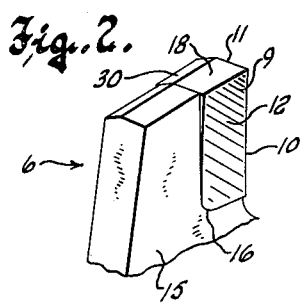
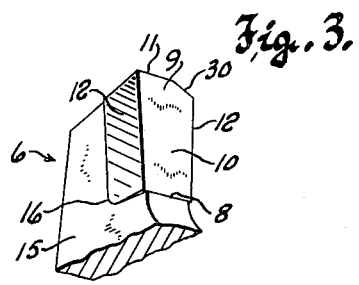
Inventor
Arthur R. Segal

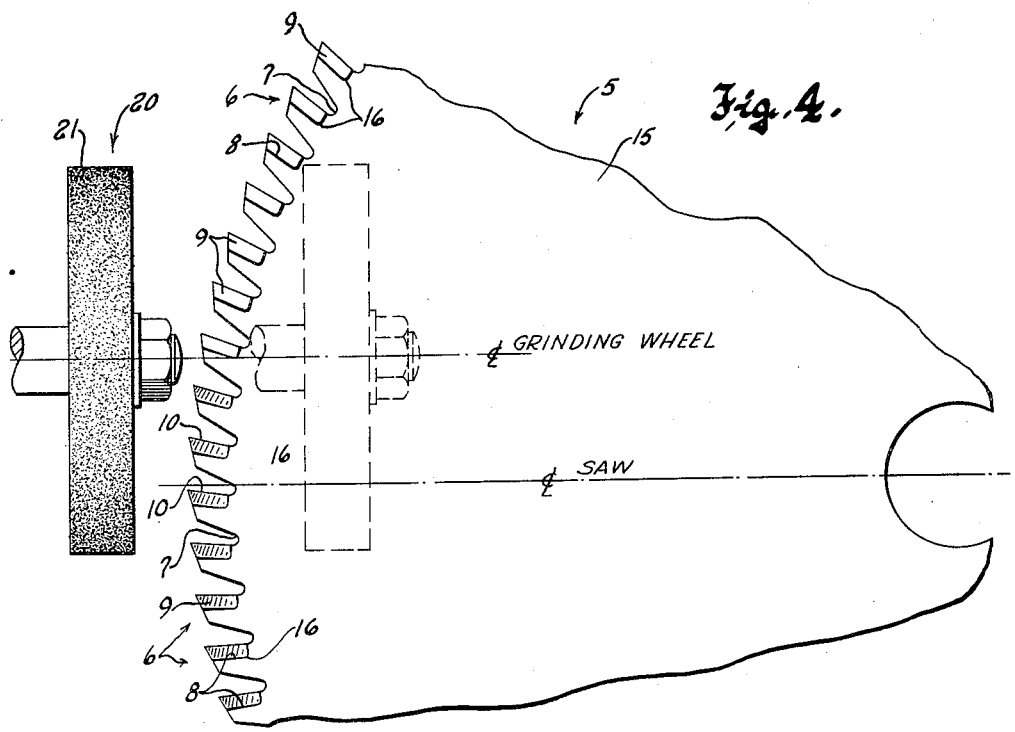
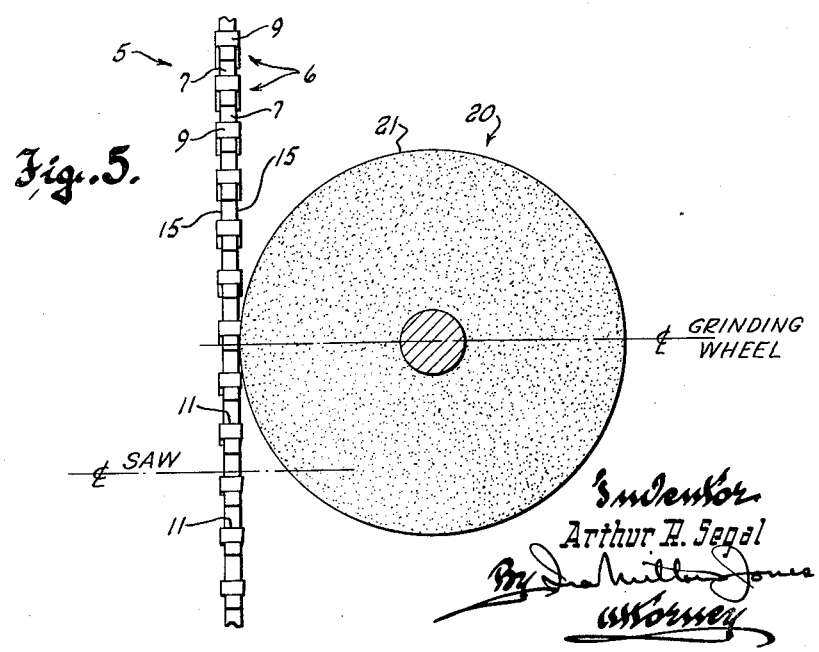

United States Patent Office 2,958,240
Patented Nov. 1, 1960

2,958,240

METHOD OF GRINDING RELIEFS ON CUTTERS

Arthur R. Segal, Edwardsville, Ill., assignor to North American Products Corp., Edwardsville, Ill., a corporation of Wisconsin Filed Aug. 16, 1957, Ser. No. 678,665

3 Claims. (Cl. 76—112)

This invention relates to a method of grinding the cutters of cutting tools, to relieve the flanks of the cutters both rearwardly from their cutting faces and inwardly from their extremities.

While the method of this invention is applicable to the cutters of cutting tools generally, it will be hereinafter described by way of example in connection with the relief grinding of the cutting tips affixed to the teeth of circular saws, for which purpose the method is ideally suited.

The use of tungsten carbide cutting tips on the teeth of cutting tools of all types, including the teeth of circular saws, has become very common in recent years. Saw blades and other tools equipped with such cutting tips may be operated at higher speeds than was possible with tools having integral hardened steel teeth, and therefore they make possible a substantial increase in production rates. Moreover, the carbide tips, because of their extreme hardness, have the ability to stay sharp over much longer periods of use than was possible with hardened steel tools.

Carbide cutting tips on circular saws and the like are formed from small blocks of tungsten carbide which are brazed or otherwise bonded into notches in the fronts of the teeth on the saw body. After the blocks are installed on the saw teeth, they must be ground to bring each tip to a uniform size and shape. The front or cutting face of each tip and its circumferential faces or flanks must be ground to provide sharp side cutting edges at their junctions. In addition, the flanks of each cutting tip must taper circumferentially rearwardly from its cutting face so that the tips are widest at their cutting faces, to provide so-called circumferential relief. In many cases the flanks of each cutting tip were also tapered radially inwardly from its extremity so that the tip had greatest face width at its extremity, to provide so-called radial relief. Therefore, the laterally projecting flanks of each tip must be ground to provide circumferential relief alone, or both circumferential and radial reliefs. When so ground, each flank surface of the cutting tip is disposed at a slight acute angle to the adjacent face of the saw body, and preferably the flanks of the cutting tip should very nearly merge or feather into the side faces of the saw body at the heel of the tip.

Heretofore the flanks of the cutting tips have been ground by means of a substantially cup-shaped abrasive wheel, the rim of which provided the abrasive face. It was necessary to hold the wheel, during each grinding operation, with its axis at precisely determined oblique angles to the face of the saw body and to the saw body axis, and to translate the abrasive wheel transversely to its axis an accurately predetermined distance. If the abrasive wheel was moved too far in its cutting stroke, it engaged the metal of the saw body, and this not only weakened the saw body but loaded the fine grit abrasive wheel with steel from the saw body, so that the abrasive wheel might crack any of the carbide tips subsequently ground therewith.

Thus the grinding of the flanks of carbide cutting tips by previously used methods was a difficult and time consuming task, requiring a high degree of skill and producing relatively frequent and costly failures.

By contrast, it is an object of the present invention to provide a method of grinding the laterally projecting flanks of carbide cutting tips on a circular saw blade or other tool, to relieve the flanks of the tips rearwardly from their cutting faces, and to also relieve the flanks of the tips inwardly from their outer extremities, wherein a grinding wheel with a circumferential grinding surface is used, and wherein the grinding wheel is translated axially during the grinding operation so that the angular disposition of the grinding wheel axis relative to the tool body and the tip being ground may be very easily and accurately maintained.

In this same connection it is also an object of this invention to provide a method of relief grinding the flanks of carbide cutting tips on a circular saw blade or the like, using a grinding wheel with a circumferential abrasive surface, in which method the axis of the grinding wheel is disposed parallel to the saw body faces during the grinding operation so that adjustment of the relative dispositions of the saw body and the grinding wheel is readily achieved, and so that simple and inexpensive fixtures may be used in the performance of the grinding operation.

Another object of this invention resides in the provision of a method of relief grinding the flanks of carbide cutting tips on a circular saw blade or the like whereby the rear of each tip and its heel or axially inner portion may be ground almost exactly flush with the adjacent face of the blade body without danger of engaging the abrading surface of the wheel against the softer metal of the blade body, and wherein excessive travel of the abrasive wheel during the grinding operation will not result in damage to either the saw blade, or the abrasive wheel.

With these and other objects in view which will appear as the description proceeds, this invention resides in the novel method substantially as hereinafter set forth and more particularly defined in the appended claims, it being understood that such changes in the precise embodiment of the hereindisclosed invention may be made as come within the scope of the claims.

The accompanying drawings illustrate one complete example of the method of the invention according to the best mode so far devised for the practical application of the principles thereof, and in which:

Figure 1 is a fragmentary view of a circular saw blade having carbide cutting tips ground in accordance with the method of this invention;

Figure 2 is a fragmentary rear perspective view of one of the teeth of the saw blade shown in Figure 1;

Figure 3 is a front perspective view of the tooth shown in Figure 2;

Figure 4 is a side elevational view of a saw blade and grinding wheel, illustrating more or less diagrammatically the method of this invention for grinding cutting tips; and Figure 5 is an edge view of a saw blade having cutting tips which are being ground by the method of this invention.

Referring now to the accompanying drawings, in which like numerals designate like parts throughout the several views, the numeral 5 designates generally the body of a tool, here shown as a circular saw blade, the faces 15 of which are substantially flat and parallel to one another, and the periphery of which is provided with teeth 6, each of which is separated from its adjacent teeth by gullets 7. At the front of each tooth the saw body is provided with a notch 8 in which a tungsten carbide cutting tip 9 is brazed or otherwise securely fastened.

In order for the cutting tips to cut a clean kerf in material being sawed, each must be provided with circumferential relief to avoid any possibility of its becoming wedged between the walls of the kerf; that is, the flanks of the cutting tip should taper inwardly and rearwardly from its cutting face 10. Preferably the tip should also be provided with radial relief; that is, the transverse cutting edge 11 at the outer extremity of the tip adjacent to its cutting face should extend along the greatest width thereof, and the flanks of the tip should taper radially inwardly toward the faces of the saw body from its peripheral face 18, as best seen in Figures 2 and 3. Thus both flanks 12 of each cutting tip must have their surfaces disposed at a slight oblique angle, both circumferentially and radially, to their adjacent faces 15 of the blade body.

As is conventional, the carbide tips for a saw blade, when initially fastened in place, are in the form of substantially rectangular blocks or bars with parallel front and rear faces; and after they are installed their laterally projecting flanks are ground with an abrasive wheel to provide the tips with the desired radial and circumferential relief. Heretofore it has been the practice to grind the flanks of the tips to flat surfaces, using the rim face of a cup-shaped abrasive wheel, and it will be seen that if the abrasive wheel which effects such grinding is moved too far into the saw body it will engage the metal of the saw body face, usually near the heel 16 of the tip being ground, with the undesirable results described above.

The present invention contemplates that the flanks of the carbide tips shall be ground to a concave contour defined by a portion of the surface of a cylinder having its axis parallel to and spaced outwardly from the adjacent face of the saw body and extending substantially (but not exactly) radially from the axis of the saw body. The concavely curved flanks of the cutting tips define a cutting face 10 which has side edges that taper inwardly from its cutting edge 11 to its heel, and a circumferential face 18 which has concavely curved side edges that taper inwardly and rearwardly from the cutting edge.

Such curvature of the flank surfaces is attained by the tip flank grinding method of this invention. As contrasted with the previously employed method, wherein the rim face of a cup-shaped grinding wheel was used to grind the tip flanks to a flat surface, the method of this invention contemplates the use of a conventional substantially small diameter grinding wheel 20 the periphery 21 of which provides the abrasive surface that engages the tip flank, and which is translated axially across each flank of the cutting tip during the grinding operation to impart the above described cylindrical curvature thereto.

Specifically, as may be seen from Figures 4 and 5, the grinding wheel is disposed with its axis substantially parallel to the faces of the saw body and in a predetermined angular relationship to the cutting face of the tip, which angular relationship is more fully and specifically described hereinafter; and while the grinding wheel is so disposed relative to the saw blade, the grinding wheel is rotated on its axis and is simultaneously translated axially (or the saw blade is translated relative to the grinding wheel) to move the grinding wheel along the length of the tip flank, in abrading engagement therewith.

If the grinding wheel axis is exactly parallel to the saw body faces during grinding of the tip flanks, it will be apparent that axial translation of the grinding wheel cannot result in abrasion of the saw body or the tooth portions thereof behind the tips, no matter how far the wheel is moved in such translation, so long as the distance between the grinding wheel axis and the adjacent saw body face is not less than the radius of the grinding wheel. Preferably the axis of the wheel will be spaced from the adjacent saw body face a distance slightly greater than the radius of the grinding wheel, leaving the flanks of each cutting tip projecting only a small distance laterally beyond the saw body faces at the narrowest portions of the tips.

It will be appreciated that the orientation of the grinding wheel axis relative to the saw body is important to achievement of the desired results. In addition to being parallel or very nearly so to the faces of the saw body, the axis of the grinding wheel must lie in a plane which is perpendicular to the saw body faces and which intersects the saw body at, or closely adjacent to, that portion of the heel of the cutting tip which is remote from the front face 10 of the tip. This reference plane in which the wheel axis lies corresponds to the line designated in Figures 4 and 5 as the center line of the grinding wheel.

The deepest part of the cut made by the grinding wheel will of course be along this plane extending through the grinding wheel axis perpendicular to the saw body faces, and it is for this reason that said plane must pass through, or closely adjacent to, the rear portion of the heel of the blade tip, thus assuring that said rear heel portion of the tip will be the narrowest portion of the tip. If said reference plane is disposed slightly forwardly of the inner rear corner of the cutting tip, then the narrowest portion of the tip will be a corresponding distance ahead of said inner rear corner of the tip, and the heel portion of the flank surface will have a slight outward curvature both forwardly and rearwardly of its narrowest transverse dimension.

If the above described reference plane were disposed closer to the cutting face of the tip than to its rear face, forward portions of the tip would be narrower than the heel, and this configuration would be undesirable for most applications; hence it can be stated as a general rule that said reference plane containing the wheel axis must be located substantially closer to the heel or rear portion of the tip than to its cutting face, in order to insure adequate circumferential relief.

It will also be apparent from Figures 4 and 5 that the amount of circumferential relief ground into the tip flanks will be substantially inversely proportional to the diameter of the abrasive wheel, that is, other factors being unchanged, a large circumferential relief will result from the use of a small diameter wheel, while a small circumferential relief will result from use of a large diameter wheel. However, a small diameter wheel on the order of 3" in diameter has been found to give good results, and is especially desirable if the teeth of the saw are small and close together.

In order to provide the flanks of the tips with radial relief, the reference plane which extends through the wheel axis perpendicular to the faces of the saw body must also be disposed at an acute angle to the plane of the cutting face 10 of the tip. This is the same as saying that said reference plane containing the abrasive wheel axis must be farther back from the cutting face at the radially outermost portion of the blade tip than at its innermost portion, as best seen in Figure 4.

From Figures 4 and 5 it will also be seen that if the grinding wheel is moved radially inwardly along the flank of a cutting tip, the tip will be engaged by peripheral portions of the wheel which lie progressively closer to the reference plane, and the tip flank will therefore be ground down farther and farther as the wheel progresses inwardly, the limit being reached when the wheel is in engagement with the cutting tip along the reference plane. This, again, explains why the reference plane should pass through, or very closely adjacent to, the rear heel portion of the cutting tip.

From what has just been said it will be apparent that the amount of radial relief which is ground into the cutting tip will be substantially in direct proportion to the size of the angle between the reference plane and the plane of the cutting face 10 of the tip. If this angle is large, other factors being equal, the radial relief will be large, that is, the cutting tip will be substantially narrower at its heel portion than at its outer cutting edge; but if the reference plane is parallel to the cutting face of the tip, the radial relief will be zero, and the radially inner end of the tip will be the same width as the outer end thereof, as measured across the cutting face parallel to the saw blade axis.

From the foregoing description taken together with the accompanying drawings it will be apparent that this invention provides a method of grinding the laterally projecting flanks of the cutting tips of a circular saw blade or the like by means of an abrasive wheel having a circumferential grinding surface, by which method the abrasive wheel may be readily disposed in an easily maintained relationship to the saw blade body such that the desired radial and circumferential relief will be obtained on each cutting tip, the wheel being translated axially relative to the saw blade (or the saw blade being translated parallel to the wheel axis), and which method assures that travel of the wheel in its cutting stroke will not result in abrasion of the saw blade body. It will also be apparent that the invention provides a saw blade which is inexpensive to manufacture and which has superior cutting characteristics, high resistance to wear, and long life.

What is claimed as my invention is:

1. The method of employing an abrading element having a convex abrading surface to circumferentially and radially relieve the projecting flank of a cutting tip on the peripheral portion of a circular rotatable tool body having a flat face disposed crosswise of the body axis and from which said tip flank projects, and wherein the tip has a cutting face that is substantially parallel to the axis of the tool body and extends inwardly from the periphery thereof, which method is characterized by the fact that during abrasion, the convex surface of the abrading element is applied to the tip flank in such relation to the body and the tip thereon that its portion which is closest to said face of the body is at all times located on a line which is substantially parallel to said face of the body and lies in a plane disposed intermediate the body axis and substantially the entire cutting tip, and which plane defines an outwardly divergent acute angle with the cutting face of the tip so that least abrasion takes place at the outer portion of the tip flank adjacent to its cutting face, and deepest abrasion takes place at the inner portions of the tip flank which are farthest from the cutting face of the tip.

2. The method of employing an abrading element having a convex abrading surface to abrade the flank of a cutting tip having a cutting face at its front, and which tip is mounted on the outer edge of a tool body which has a face from which said flank projects laterally, in order to concurrently relieve said flank of the tip both rearwardly from its cutting face and inwardly from its outer extremity, which method is characterized by the fact that during abrasion the abrading element is maintained in such relation with the tool body and the tip thereon that that portion of the convex abrading surface of the element which is closest to said face of the body is at all times located on a line which is substantially parallel to said face of the tool body and lies in a plane that defines an outwardly divergent acute angle with the cutting face of the tip and is contiguous to an inner portion of the tip which is farthest from the face of the tip, so that least abrasion takes place at the outer portions of the tip flank adjacent to its cutting face, and deepest abrasion takes place at inner portions of the tip flank which are farthest from its cutting face.

3. The method of grinding the laterally projecting flank of a cutting tip on a tooth of a circular saw body by means of an abrasive wheel having a cylindrical abrading surface, which method is characterized by the steps of: while maintaining the abrading surface of the wheel spaced from that face of the body from which the flank projects a distance at least equal to the radius of the wheel, effecting relative translatory motion between the abrasive wheel and the saw body in a direction parallel to the wheel axis, with the wheel and saw body in relative positions such that the axis of the abrasive wheel lies in a plane which is parallel to the axis of the saw body but is disposed intermediate the body axis and substantially the entire cutting tip and defines an outwardly divergent acute angle with the cutting face of the tip, but with said plane contiguous to an inner portion of the tip which is farthest from said cutting face thereof; and rotating the wheel on its axis during such relative translation of the wheel and saw body to cause the wheel to grind a cylindrical concavity in the tip flank which concavity is deepest at the inner portions of the tip flank farthest from its cutting face and shallowest at the outer portion of the tip flank adjacent to its cutting face.

References Cited in the file of this patent

UNITED STATES PATENTS

| | | |
|---|---|---|
| 899,421 | Mills | Sept. 22, 1908 |
| 1,837,344 | Stauder | Dec. 22, 1931 |
| 2,600,272 | Segal | June 10, 1952 |
| 2,659,397 | Drake | Nov. 17, 1953 |
| 2,714,317 | Drake | Aug. 2, 1955 |